J. FRANCISCO.
SIGNALING DEVICE.
APPLICATION FILED DEC. 22, 1921.
1,437,643.
Patented Dec. 5, 1922.
FIG-1-
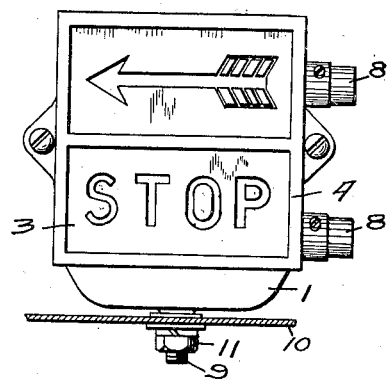
FIG-2-
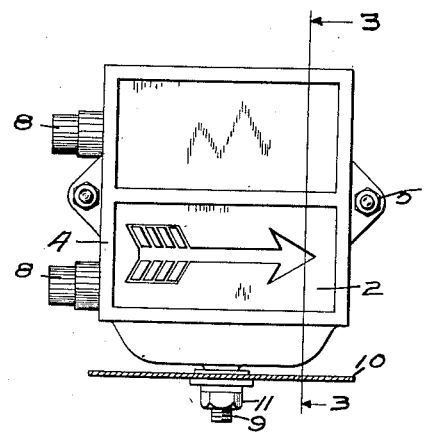
FIG-3-
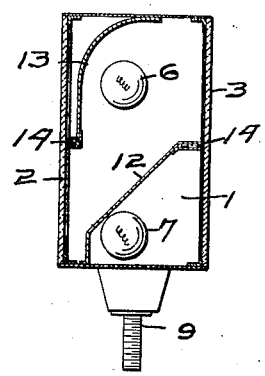
FIG-4-
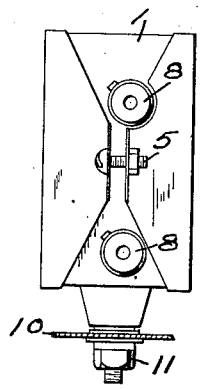
INVENTOR
Julian Francisco.
by
Owen, Owen & Crampton.

Patented Dec. 5, 1922.

1,437,643

UNITED STATES PATENT OFFICE.

JULIAN FRANCISCO, OF TOLEDO, OHIO.

SIGNALING DEVICE.

Application filed December 22, 1921. Serial No. 524,072.

*To all whom it may concern:*

Be it known that I, JULIAN FRANCISCO, a citizen of the United States, and a resident of Toledo, in the county of Lucas and State of Ohio, have made an invention appertaining to Signaling Devices; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a simple and efficient signaling device for automobiles whereby the intention of the driver of an automobile may be signaled to others, such as a traffic officer, drivers of other automobiles, and to pedestrians.

Constructions containing the invention may be varied in their details. To illustrate a practical application of the invention I have selected a signaling device and shall describe it hereinafter. The signaling device selected for purposes of illustration is shown in the accompanying drawings.

Figure 1 of the drawings illustrates a rear view of the signaling device which is ordinarily mounted on the left rear fender of an automobile. Fig. 2 illustrates a front view of the device. Fig. 3 illustrates a sectional view taken on the line 3—3 indicated in Fig. 2. Fig. 4 is an end view showing the connecting means for the lamps located in the signaling device.

1 is a shell which may be of any form but is preferably rectangular. It is provided with front and rear plates of glass 2 and 3 that may be secured in the shell 1 by any suitable means, such as by the frames 4. The frames 4 may be secured to the shell 1 by any suitable means, or the ends thereof may be clamped together as by the screws or nuts 5 if desired.

A pair of electric lamps 6 and 7 are located in the shell 1 and are provided with the usual connectors 8 whereby a wire may be connected with one terminal of the lamp, the other terminal being grounded through the shell 1 and the stud 9 which connects the signaling device with a part of the car, such as the rear left fender 10. The nut 11 may be used for clamping the signaling device in position.

The shell is divided in two chambers by the diagonally disposed reflecting parts 12 formed of bright sheet metal, such as aluminum or nickeled or tin sheet iron. The lamp 6 is located in one chamber and the lamp 7 is located in the other chamber. A second reflector 13 which is cylindrical in form is located in front of the lamp 6 to reflect certain rays of the lamp 6 rearward towards the glass plate 3 and other of the rays downward towards the reflector 12 while the reflector 12 operates to reflect the rays from the lamp 6 forward towards the glass plate 2 and to reflect the rays of light from the lamp 7 rearward towards the plate 3. To prevent the light from the lamp 6 and rays of the lamp 7 from passing to the upper portions of the plates 2 and 3 respectively, felt strips 14 may be located intermediate the lower edge of the reflector 13 and the upper edge of the reflector 12 and the plates 2 and 3 respectively. The lower half of the glass plate 2 and the upper half of the glass plate 3 and on the inside of the said plates are painted some other color than red, as green for example, except for the outline of arrows that point to the left of the automobile, and the lower half of the glass plate 3 is preferably painted red on the inside thereof except the outline of the letters that form the word "Stop", thus leaving the representations of arrows and the letters of the word "Stop" in outline and transparent to light. Over the surface of the painted portions are also painted aluminum paint or some other paint that will produce bright reflecting surfaces. The coating of aluminum paint will cause the return of the rays of light that strike the plate on the painted portions towards the interior of the shell 1 which is formed of sheet material having a suitable reflecting surface and to the reflectors 12 and 13, thus causing the rays of light from the lamps 6 and 7 to eventually pass through the transparent portions of the signaling device.

By painting the plates red and green they present these colors through the plates of glass to the exterior, and painting aluminum over the coats of paint prevents the loss of light that would be caused by transmission through the translucent portions that would be produced and at the same time affords a reflecting means to the light and causes the arrows and the word to stand out prominently in the daytime as well as in the night. Furthermore, the arrows, while they are lighted by the lamp 6, are out of alignment, that is, they are not located on opposite sides of the lamp 6 but are located one on the lower half of the plate 2 and the other on the upper half of the plate 3. This prevents the daylight from entering the chamber in which the lamp 6 is located and prevents one arrow being seen through the other arrow.

I claim:

In a signaling device, a shell, plates located on opposite sides of the shell having signal indicating parts, a pair of electric lamps located in the shell, a diagonally disposed reflecting plate located between the electric lamps for reflecting the light from the lamps in opposite directions, a second reflector for reflecting the light of one of the lamps in the same direction that the light of the other of the lamps is reflected by the reflecting partition, and for reflecting the light towards the reflecting partition.

In testimony whereof, I have hereunto signed my name to this specification.

JULIAN FRANCISCO.